US012732923B2

(12) United States Patent
Sun et al.

(10) Patent No.: US 12,732,923 B2
(45) **Date of Patent: *Sep. 8, 2026**

(54) LTE NR POWER CONTROL FOR EN-DC

(71) Applicant: Apple Inc., Cupertino, CA (US)

(72) Inventors: Haitong Sun, Irvine, CA (US); Johnson O. Sebeni, Fremont, CA (US); Zhu Ji, San Jose, CA (US); Dawei Zhang, Saratoga, CA (US); Wei Zhang, Santa Clara, CA (US); Yuchul Kim, Santa Clara, CA (US); Tianyan Pu, Cupertino, CA (US); Pengkai Zhao, San Jose, CA (US); Wei Zeng, San Diego, CA (US); Jia Tang, San Jose, CA (US); Ping Wang, San Jose, CA (US); Wanping Zhang, San Jose, CA (US); Yang Li, Plano, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,364

(22) Filed: Sep. 18, 2023

(65) Prior Publication Data

US 2024/0080780 A1 Mar. 7, 2024

Related U.S. Application Data

(63) Continuation of application No. 16/579,544, filed on Sep. 23, 2019, now Pat. No. 11,765,668.

(Continued)

(51) Int. Cl.

*H04B 7/0426* (2017.01)
*H04B 7/08* (2006.01)

(Continued)

(52) U.S. Cl.

CPC ....... *H04W 52/367* (2013.01); *H04W 52/146* (2013.01); *H04W 52/52* (2013.01); *H04W 72/0473* (2013.01); *H04W 72/21* (2023.01)

(58) Field of Classification Search

CPC . H04W 52/146; H04W 52/16; H04W 52/221; H04W 52/228; H04W 52/246; H04W 52/248; H04B 7/0404

(Continued)

(56) References Cited

U.S. PATENT DOCUMENTS

| | | | |
|---|---|---|---|
| 6,301,467 | B1 | 10/2001 | Jarvinen |
| 2004/0063406 | A1 | 4/2004 | Petrus |

(Continued)

FOREIGN PATENT DOCUMENTS

| | | |
|---|---|---|
| CN | 102577542 | 7/2012 |
| CN | 103339994 | 10/2013 |

(Continued)

OTHER PUBLICATIONS

Extended European Search Report for European Patent Application No. 19200027.1; Feb. 14, 2020.

(Continued)

*Primary Examiner* — Marcus Smith
*Assistant Examiner* — Jason A Harley
(74) *Attorney, Agent, or Firm* — Kowert, Hood, Munyon, Rankin & Goetzel, P.C.

(57) ABSTRACT

Apparatuses, systems, and methods for providing maximum transmit power control when utilizing multiple radio access technologies. For example, a wireless communication device comprising two cellular radios may intend to transmit on the first radio, while concurrently transmitting on the second radio. To ensure compliance with a maximum transmit power limitation, the device may determine an allowed transmit power level of the first radio, representing a dif- (Continued)

ference between the maximum transmit power limitation and the current transmit power level being transmitted by the second radio. The device may also determine a threshold power level for a communication by the first radio. If the allowed transmit power level meets the threshold power level, then the device may transmit the first communication having a power level between the threshold power level and the allowed transmit power level. Otherwise, the device may forego transmission of the first communication.

20 Claims, 7 Drawing Sheets

Related U.S. Application Data

(60) Provisional application No. 62/738,616, filed on Sep. 28, 2018.

(51) Int. Cl.

| | |
|---|---|
| ***H04B 7/155*** | (2006.01) |
| ***H04W 52/00*** | (2009.01) |
| ***H04W 52/02*** | (2009.01) |
| ***H04W 52/04*** | (2009.01) |
| ***H04W 52/14*** | (2009.01) |
| ***H04W 52/16*** | (2009.01) |
| ***H04W 52/36*** | (2009.01) |
| ***H04W 52/52*** | (2009.01) |
| ***H04W 72/044*** | (2023.01) |
| ***H04W 72/21*** | (2023.01) |

(58) Field of Classification Search
USPC .......................................... 455/522; 370/318
See application file for complete search history.

(56) References Cited

U.S. PATENT DOCUMENTS

2008/0113634 A1 5/2008 Gates
2012/0314665 A1 12/2012 Ishida
2013/0053089 A1 2/2013 Hwang
2015/0036566 A1 2/2015 Blankenship
2015/0195795 A1 7/2015 Loehr
2016/0205631 A1 7/2016 Chen
2016/0262172 A1 9/2016 Yan
2017/0257807 A1 9/2017 Zacharias
2017/0325277 A1 11/2017 Fujishiro
2017/0346448 A1* 11/2017 Maxim ................ H03F 1/3211
2018/0007643 A1* 1/2018 Tiirola ................ H04W 52/262
2018/0007697 A1 1/2018 Tolochko
2018/0049037 A1 2/2018 Lopez
2018/0184452 A1 6/2018 Bitra
2019/0215783 A1 7/2019 Chakraborty
2019/0320396 A1* 10/2019 Bagheri ................ H04W 52/34
2020/0267665 A1* 8/2020 Wei ..................... H04W 52/365
2020/0396621 A1* 12/2020 Park ...................... H04W 24/02

FOREIGN PATENT DOCUMENTS

CN 104350790 2/2015
CN 105379395 3/2016
WO 2017034237 3/2017

OTHER PUBLICATIONS

CATT: "Power Sharing Mechanism"; 3GPP Draft; R1-1710042_ Power Sharing, Jun. 26, 2017, 3rd Generation Partnership Project (3GPP), RAN WG1, Jun. 26, 2017.
Qualcomm: "Maintenance for NR-LTE co-existence"; 3GPP Draft; R1-1809431 Maintenance for NR-LTE co-existence, 3rd Generation Partnership Project (3GPP), Aug. 11, 2018.
Office Action for CN Patent Application No. 201910920533.4; Jan. 10, 2023.
Jinqiang Xing "Research on mutual interference between LTE and 5G NR terminals"; Mobile Communications; Feb. 15, 2018.
Xiaodong Chen "Research on 5G New air interface and LTE carrier sharing techniques"; Mobile Communications; Sep. 15, 2017.
MCC "R4-161502 RAN4-78 meeting report"; 3GPP TSG-RAN WG4 Meeting #78bis; Apr. 11, 2016.
Toni Levanen "5G new radio and LTE uplink coexistence"; 2018 IEEE Wireless Communications and Networking Conference (WCNC); 2018.
The Omitted Dimension: Exploiting Multiuser Diversity in Multi-Radio Access Technology Data Cellular Communication Systems; Ahmed Alsohaily, (Member, IEEEO) and Elvino S. Sousa (Fellow, IEEE) May 4, 2016.

* cited by examiner

LTE NR POWER CONTROL FOR EN-DC

PRIORITY CLAIM

This application is a continuation of U.S. patent application Ser. No. 16/579,544, titled "LTE NR Power Control for EN-DC", filed Sep. 23, 2019, which claims benefit of priority of U.S. Provisional Application Ser. No. 62/738,616, titled "Downlink Control for Non Coherent Joint Transmission", filed Sep. 28, 2018, which is hereby incorporated by reference in its entirety as though fully and completely set forth herein.

FIELD

The present application relates to wireless devices, and more particularly to apparatus, systems, and methods for providing maximum transmit power control when utilizing multiple radio access technologies.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to provide control of maximum transmit power when utilizing multiple radio access technologies.

An apparatus is disclosed for generating a wireless communication signal. The apparatus may include a memory storing software instructions, and at least one processor configured to execute the software instructions. By executing the software instructions, the at least one processor may determine a first threshold power level for a first communication for transmission by a first radio of a wireless communication device; and determine an allowed transmit power level, representing a difference between a maximum transmit power limitation of the wireless communication device and a current transmit power level of an ongoing communication being transmitted by a second radio of the wireless communication device. In response to determining that the allowed transmit power level meets the first threshold power level, the at least one processor may cause the first communication to be transmitted by the first radio, the first communication having a power level not greater than the allowed transmit power level. In response to determining that the allowed transmit power level does not meet the first threshold power level, the at least one processor may forego transmission of the first communication.

In some implementations, the at least one processor may identify a preferred transmit power level of the first radio, wherein determining the allowed transmit power level is in response to determining that a sum of the preferred transmit power level of the first radio and the current transmit power level of the ongoing communication being transmitted by a second radio exceeds the maximum transmit power limitation.

In some implementations, the at least one processor may identify a preferred transmit power level of the first radio, wherein the first threshold power level is determined as a function of the preferred transmit power level of the first radio. In some implementations, the function may vary based on a type of a physical layer (PHY) channel included in the first communication.

In some implementations, in response to determining that a transmission by the second radio has ended after the determining that the allowed transmit power level does not meet the first threshold power level, the at least one processor may determine an updated allowed transmit power level; and cause the first communication to be transmitted in response to determining that the updated allowed transmit power level meets the first threshold power level.

In some implementations, the first communication may consist of a first physical layer (PHY) channel, and causing the first communication to be transmitted may include causing a signal to be transmitted, the signal including a plurality of PHY channels including the first PHY channel.

In some implementations, the first communication may include a first physical layer (PHY) channel. The at least one processor may determine a second threshold power level for a second communication for transmission by the first radio, the second communication comprising a second PHY channel, the second threshold power level being lower than the first threshold power level. In response to determining that the allowed transmit power level meets the second threshold power level, the at least one processor may cause the second communication to be transmitted by the first radio, the second communication having a power level not greater than the allowed transmit power level. In response to determining that the allowed transmit power level does not meet the threshold power level, the at least one processor may forego transmission of the second communication.

In some scenarios, the maximum transmit power limitation may indicate a maximum power that may be transmitted without activating a currently inactive power amplifier (PA) stage of the wireless communication device.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
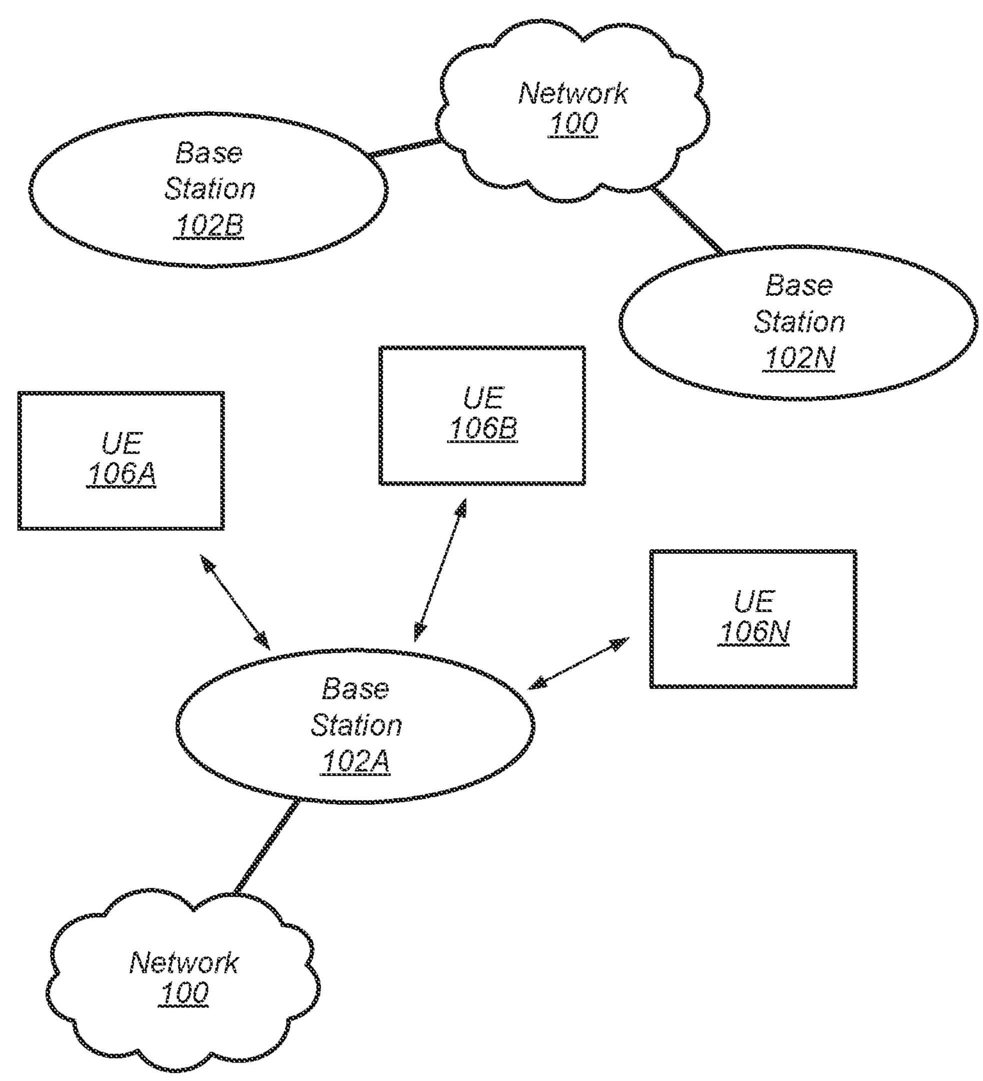
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 2:
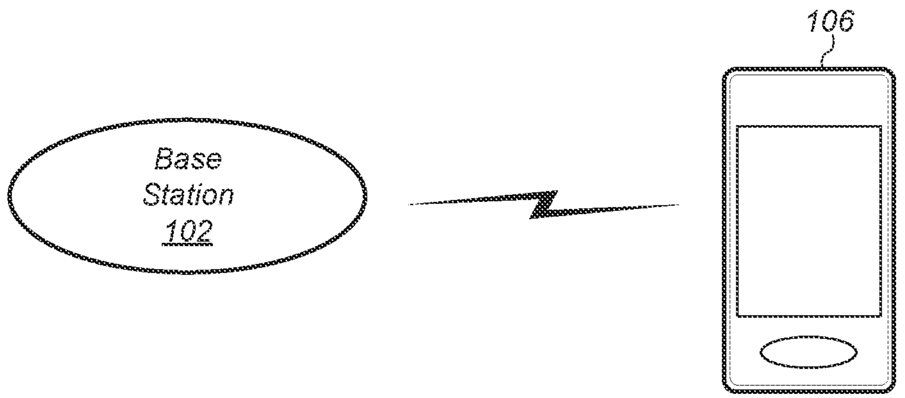
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
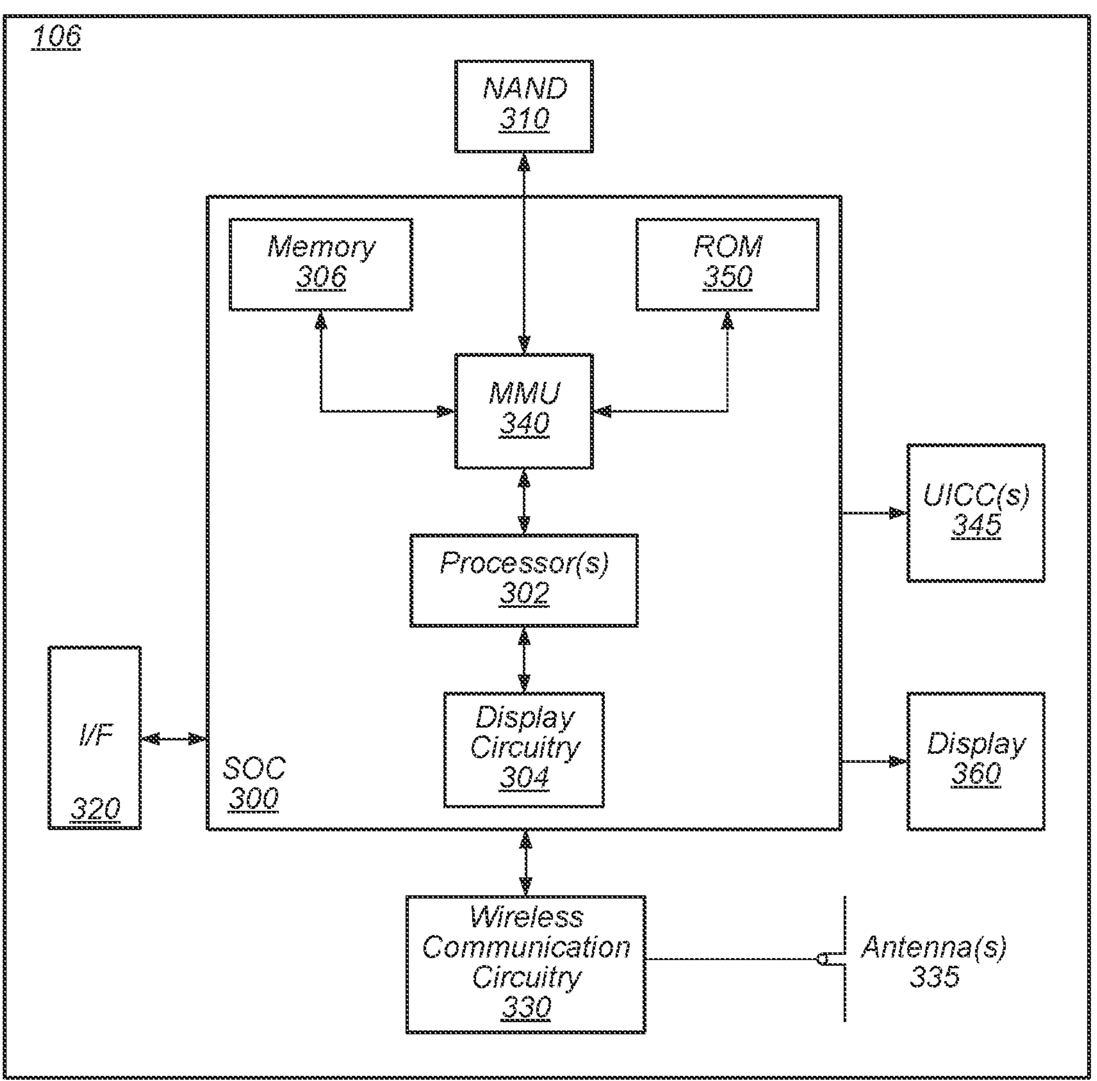
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
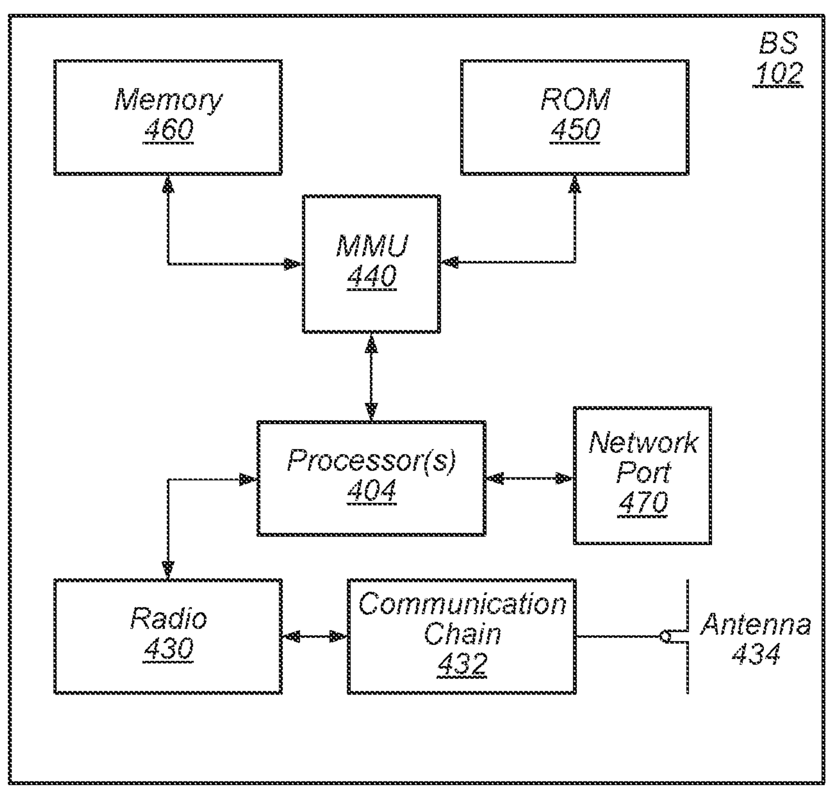
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC)

network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
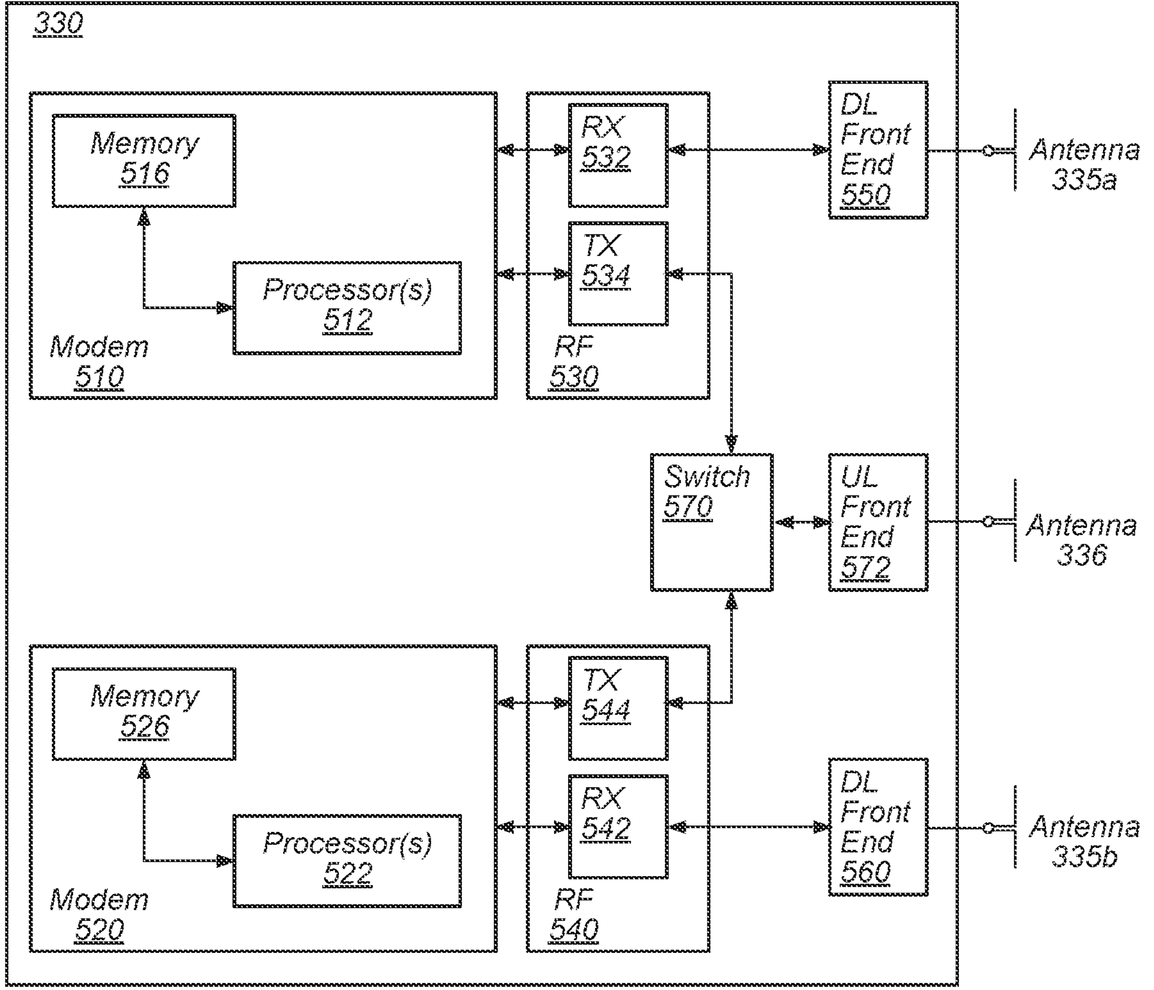
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572). In some scenarios, cellular communication circuitry 330 may receive instructions to transmit according to both the first RAT (e.g., as supported via modem 510) and the second RAT (e.g., as supported via modem 520) simultaneously. In such scenarios, switch 570 may be switched to a third state that allows modem 510 to transmit signals according to the first RAT (e.g., via a transmit chain that includes transmit circuitry 534 and UL front end 572) and modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

In some embodiments, the cellular communication circuitry 330 may couple (e.g., communicatively; directly or indirectly) to a plurality of antennas 336. For example, each of the RF front end 530 and the RF front end 540 may be connected to a respective antenna 336, e.g., via a respective UL front end 572.

EN-DC Transmit Power Regulation

In some modes, a mobile device, such as the UE 106, may communicate with multiple communications protocols simultaneously. For example, in LTE NR Dual Connectivity (EN-DC) mode, the UE 106 may transmit on UL in both NR and LTE simultaneously. For example, according to the LTE protocol, the UE 106 may predictably transmit a PUSCH 4 ms after receiving a DCI. Similarly, the UE 106 may predictably retransmit 4 ms after transmitting the PUSCH. However, according to the NR protocol, the timing between DCI and PUSCH, and between PUSCH and retransmission, may be shorter, and/or may be dynamic. Thus, a UE may receive an LTE DCI at a first time, causing the UE 106 to transmit an LTE PUSCH at a second time (e.g., 4 ms after the first time), and the UE 106 may also receive a NR DCI at a third time, causing the UE 106 to transmit a NR PUSCH at or about the second time, such that transmission of the NR PUSCH overlaps in time with transmission of the LTE PUSCH. Other UL signals may similarly overlap in time.

This overlap of NR and LTE UL signals may pose difficulties for the LTE and NR joint power control. For example, the UE 106 may be configured (e.g., required) to meet certain transmit power limitations, such as the following: LTE maximum transmit power limit (P_lte,max), NR maximum transmit power limit (P_nr,max), and/or total maximum transmit power limit (P_total,max). Additionally, the UE 106 may be configured (e.g., required) to reduce transmit power to limit RF impairment, e.g., due to intermodulation distortion (IMD), in order to meet emission regulations, avoid DL desense, etc.

The LTE protocol was not designed to accommodate these limitations. Specifically, when the UE 106 operates in EN-DC mode, its LTE modem (e.g., the modem 510) may not be aware of NR transmit power or grant (e.g., NR DCI). Thus, in EN-DC mode, the UE 106 may operate its LTE modem as if no NR transmissions were occurring, and may configure its NR modem (e.g., the modem 520) to accommodate any applicable transmit power limitations.

For example, the UE 106 may decrease NR UL transmit power in response to certain conditions. For example, NR UL transmit power may be decreased if the combined NR and LTE total transmit power exceeds P_total,max, or if NR UL transmit power violates an RF requirement in the form of MPR (maximum power reduction) or A-MPR (additional MPR) due to IMD, such as an emission requirement or DL desense limitation. In some scenarios, e.g., where the NR UL transmit power would be scaled beyond a certain threshold amount, the UE 106 may drop (e.g., not transmit) the NR transmission.

In some scenarios, the UE 106 may identify a preferred NR transmit power level. The preferred NR transmit power level may represent a preferred (e.g., optimized) transmit power level for the UE 106 to transmit NR UL transmissions. For example, the preferred NR transmit power level may be specified by a base station, or may be determined via open-loop power control (OLPC) or closed-loop power control (CLPC) procedures as known in the art, e.g., based on channel conditions, etc. In some scenarios, the preferred NR transmit power level may be determined without regard to LTE transmissions by the UE 106. However, due to concurrent transmission of an LTE UL signal, transmission of an NR UL signal at the preferred NR transmit power level may cause the total transmission power of the UE 106 to exceed one or more transmit power limitations (e.g., P_total, max, emission requirement, DL desense power limitation, etc.).

Therefore, the UE 106 may also determine an allowed NR transmit power level, which may represent a maximum NR transmit power that, when added to the transmit power level of the concurrent LTE UL signal (and/or other transmitted signals), will allow the total transmit power of the UE 106 (or of cellular communications of the UE 106, or of communications by the UE 106 within a particular frequency band, etc.) to remain below one or more (e.g., all) applicable (e.g., known or predetermined) transmit power limitations. E.g., the allowed NR transmit power may be the difference between a predetermined transmit power limitation and a current transmit power level of the concurrent LTE UL signal. In some scenarios, the allowed NR transmit power level may be determined in response to determining that transmitting the NR UL signal at the preferred NR transmit power level would cause the total transmission power of the UE 106 to exceed one or more power transmit power limitations.

The UE 106 may determine a threshold power level, which may represent a minimum NR transmit power level at which transmission of the NR UL signal is allowed. The threshold power level may be determined or expressed in any of various ways. For example, the threshold power level may be a fixed power value. As another example, the threshold power level may be determined or expressed as a function (e.g., a difference, percentage, ratio, decibel value) of a fixed or dynamic value, such as the preferred NR transmit power level or a maximum NR transmit power level.

The UE 106 may compare the allowed NR transmit power level to the threshold power level. In response to determining that the allowed NR transmit power level meets (or exceeds) the threshold power level, the UE 106 may transmit the NR UL signal, e.g., at (or below) the allowed NR transmit power level. Alternatively, in response to determining that the allowed NR transmit power level does not meet the threshold power level, the UE 106 may forego (e.g., cancel, delay, or temporarily forego) transmission of the NR UL signal, e.g., because risk of reception failure is deemed too great if the NR UL signal were to be transmitted at a power level lower than the threshold power level.

In some scenarios, e.g., in response to determining that the allowed NR transmit power level does not meet the threshold power level, the UE 106 may transmit the NR UL signal at a later time, e.g., after completion/termination of transmission of the LTE UL signal, which may allow for a greater allowed NR transmit power level. For example, at some later time, e.g., in response to determining that transmission of an LTE UL signal has ended or that the power level of the LTE UL signal has otherwise changed, the UE 106 may determine a new allowed NR transmit power level, and may compare the new allowed NR transmit power level to the threshold power level. Based on the comparison, the UE 106 may then determine whether to transmit the NR UL signal as described above.

Figure 6:
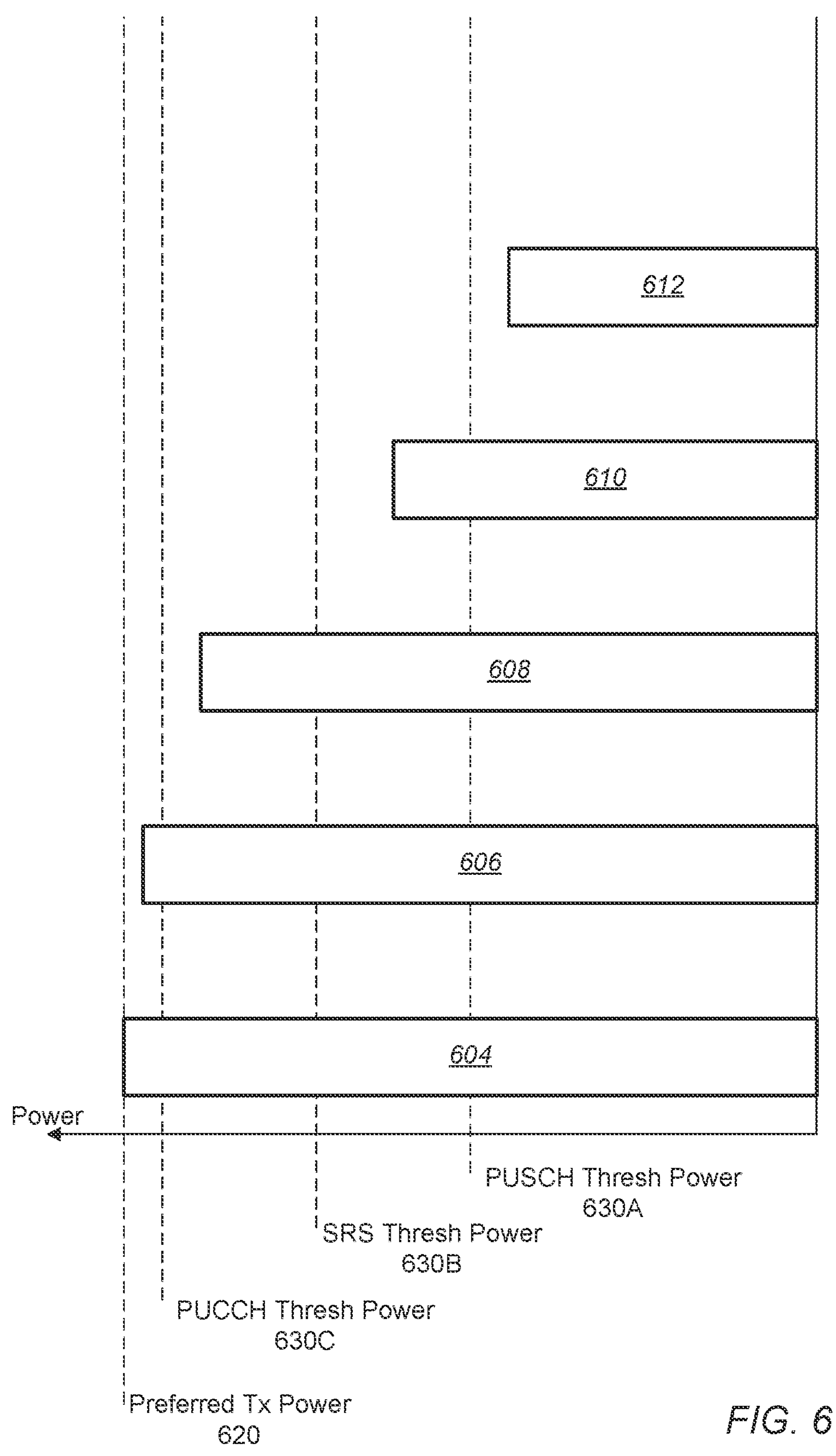
FIG. 6 illustrates application of channel-specific threshold power levels for various NR PHY channels, according to some embodiments.

FIG. 6—Single-Channel Channel-Specific Power Regulation

In some scenarios, the NR UL signal may include only a single PHY channel, e.g. PUSCH, PUCCH, or SRS. Various PHY channels may have different resilience to error. Therefore, in such scenarios, the UE 106 may determine the threshold power level based at least partly on the PHY channel to be transmitted. For example, the threshold power level may be determined (e.g., adjusted, optimized) in light of such error tolerance level or other performance metric for the relevant PHY channel. For example, a value or function used to determine the threshold power level may vary based on the PHY channel to be transmitted, e.g., based on the error tolerance of the PHY.

FIG. 6 illustrates application of channel-specific threshold power levels for various PHY channels, according to some embodiments. Specifically, FIG. 6 illustrates dotted lines representing a preferred NR transmit power level 620, and three different threshold power levels 630A-C, reflecting allowed NR transmit power levels for different PHY channels. Blocks 604-612 represent various example allowed NR transmit power levels. The allowed NR transmit power level 604 is equal to the preferred NR transmit power level 620. The allowed NR transmit power levels 606-612 are each less than the preferred NR transmit power level 620.

As a first example, NR PUSCH may utilize HARQ, which may result in relatively high error tolerance. Therefore, if the NR UL signal includes only PUSCH at a given time, such as during single PHY transmission, the UE 106 may determine the threshold power level at a level that is significantly below the preferred NR transmit power level. As one non-limiting example, the UE 106 may set the threshold power level at 50% of the preferred NR transmit power level in response to determining that the NR UL signal includes only PUSCH (meaning that the threshold power level is 3 dB lower than the preferred NR transmit power level). Thus, the NR PUSCH may be transmitted with relatively low transmit power, even though such low transmit power may increase the likelihood that the transmission will not be received clearly.

The threshold power level 630A is an example of a threshold power level configured for an NR UL signal including only PUSCH at a given time, such as during single PHY transmission. As illustrated, the allowed NR transmit power levels 604-610 each exceed the PUSCH threshold power level 630A. However, the allowed NR transmit power level 612 does not meet the PUSCH threshold power level 630A. Therefore, if the NR UL signal contains only PUSCH, then the UE 106 may transmit the NR UL signal if constrained by any of the example allowed NR transmit power levels 604-610, while the UE may forego transmission of the NR UL signal if constrained by the allowed NR transmit power level 612.

As another example, NR SRS may not utilize HARQ, and may therefore be less tolerant of errors than NR PUSCH. However, NR SRS may be transmitted repeatedly (e.g., periodically), with the result that failure of an SRS transmission may be tolerated without significant impact. Thus, NR SRS may be considered to have a moderate error tolerance. Therefore, if the NR UL signal includes only SRS at a given time, such as during single PHY transmission, the UE 106 may determine the threshold power level at a level that is somewhat below the preferred NR transmit power level. As one non-limiting example, the UE 106 may set the threshold power level at 75-80% of the preferred NR transmit power level (meaning that the threshold power level is 20-25%, or approximately 1 dB, lower than the preferred NR transmit power level) in response to determining that the NR UL signal includes only SRS.

The threshold power level 630B is an example of a threshold power level configured for an NR UL signal including only SRS at a given time, such as during single PHY transmission. As illustrated, the allowed NR transmit power levels 604-608 each exceed the SRS threshold power level 630B. However, the allowed NR transmit power levels 610-612 do not meet the SRS threshold power level 630B. Therefore, if the NR UL signal contains only SRS, then the UE 106 may transmit the NR UL signal if constrained by any of the example allowed NR transmit power levels 604-608, while the UE may forego transmission of the NR UL signal if constrained by any of the allowed NR transmit power levels 610-612.

As yet another example, NR PUCCH may be transmitted only once, with an expectation of high reliability, and may therefore be very intolerant of errors. Thus, NR PUCCH may be considered to have a low error tolerance. Therefore, if the NR UL signal includes only PUCCH at a given time, such as during single PHY transmission, the UE 106 may determine the threshold power level at a level that is close to the preferred NR transmit power level. As one non-limiting example, the UE 106 may set the threshold power level at a value that is within the range of 90-100% of the preferred NR transmit power level (meaning that the threshold power level is 0-10% lower than the preferred NR transmit power level) in response to determining that the NR UL signal includes only PUCCH. Thus, the NR PUCCH may be transmitted only if it may be transmitted with a transmit power level that is close to (or equal to) the preferred NR transmit power level.

The threshold power level 630C is an example of a threshold power level configured for an NR UL signal including only PUCCH at a given time, such as during single PHY transmission. As illustrated, the allowed NR transmit power levels 604-606 each exceed the PUCCH threshold power level 630C. However, the allowed NR transmit power levels 608-612 do not meet the PUCCH threshold power level 630C. Therefore, if the NR UL signal contains only PUCCH, then the UE 106 may transmit the NR UL signal if constrained by any of the example allowed NR transmit power levels 604-606, while the UE may forego transmission of the NR UL signal if constrained by any of the allowed NR transmit power levels 608-612.

Figure 7:
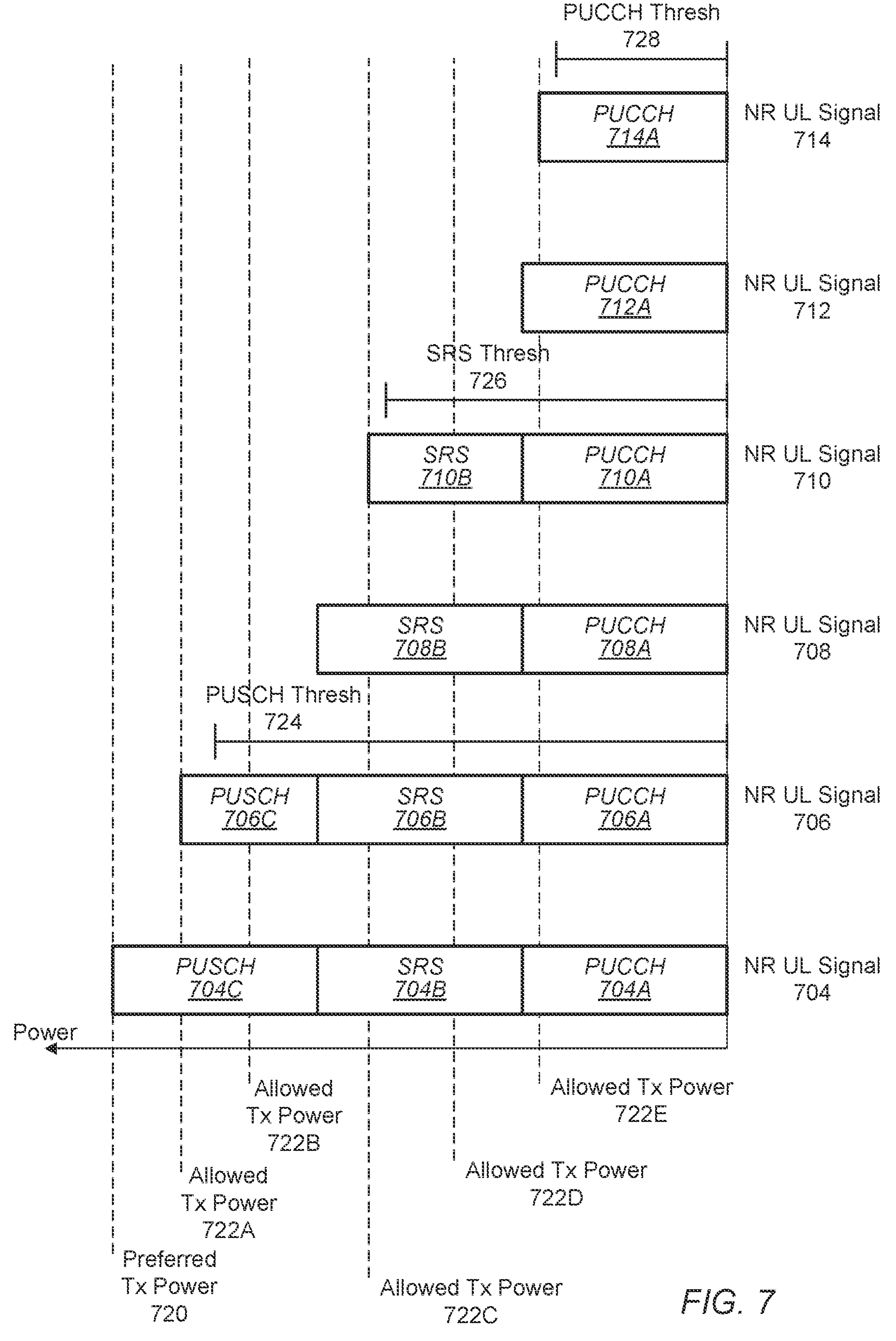
FIG. 7 illustrates examples of power reduction in NR UL signals having multiple PHY channels, in response to various allowed NR transmit power levels, according to some embodiments.

FIG. 7—Multi-Channel Channel-Specific Power Regulation

In some scenarios, the NR UL signal may include a plurality of PHY channels. In such scenarios, the UE 106 may prioritize power to certain PHY channels, e.g., based on error tolerance level or other performance metric(s) for the relevant PHY channels. Specifically, if the UE 106 determines the allowed NR transmit power level for the NR UL signal to be below the preferred NR transmit power level, then the UE 106 may reduce the power of the NR UL signal to a level at or below the allowed NR transmit power level by reducing power transmitted on the lower-priority PHY channels.

FIG. 7 illustrates several examples of NR UL signals with transmit power reduced in response to various allowed NR transmit power levels, according to some embodiments. As illustrated, the NR UL signal may include PUSCH, SRS, and PUCCH. In other scenarios, additional/alternative PHY channels may be present. In some scenarios, the UE 106 may prioritize transmission of certain PHY channels over others. In the example of FIG. 7, the UE 106 has prioritized the PUCCH over SRS and PUSCH, and has further prioritized SRS over PUSCH, e.g., based on relative error tolerance of those channels, as described above. In other scenarios, the order of prioritization may be different.

The UE 106 may determine a preferred NR transmit power level, e.g., as described above. The UE 106 may allocate a portion of the preferred NR transmit power level for each PHY channel to be included in the NR UL signal. For example, each PHY channel may be allocated a fraction or percentage of the preferred NR transmit power. As another example, one or more channels may be allocated a fixed or minimum transmit power, while one or more remaining channels may be allocated the remaining power. Other power allocation schemes are also possible. The PHY channels may be allocated equal or different power levels. As illustrated in FIG. 7, NR UL signal 704 represents a signal utilizing preferred NR transmit power level 720. The UE 106 has allocated power to each of PUCCH 704A, SRS 704B, and PUSCH 704C.

In some scenarios, the UE 106 may reduce the transmit power level of the NR UL signal in response to determining a current allowed NR transmit power level is lower than the preferred NR transmit power level 720. In reducing the transmit power level of the NR UL signal, the UE 106 may first reduce power allocated to PHY channels having a lower priority.

For example, NR UL signal 706 illustrates a signal that has been reduced in power to comply with allowed NR transmit power level 722A. Specifically, PUSCH 706C has been reduced in power, while PUCCH 706A and SRS 706B remain unchanged. As noted above, PUSCH 706C may be the lowest-priority PHY channel because it is the most error-tolerant. Thus, decreasing the power allocated to PUSCH 706C is less likely to result in decreased user experience than decreasing the power allocated to other PHY channels.

However, if the power allocated to PUSCH 706C is decreased too far, then the likelihood of reception failure for the PUSCH may become unacceptably high. Thus, the UE 106 may determine PUSCH threshold 724, which may represent a minimum transmit power at which transmission of the PUSCH is allowed. For example, in some scenarios, the UE 106 may determine a minimum power level to be allocated to the PUSCH, e.g., before the likelihood of reception failure may be come unacceptably high. E.g., this minimum power level of the PUSCH may be determined in a manner similar to the threshold power level discussed above. The PUSCH threshold 724 may be determined by adding this minimum power level of the PUSCH to the power allocated to higher-priority PHY channels (e.g., PUCCH 704A and SRS 704B).

If the allowed NR transmit power level is determined to be below the PUSCH threshold 724, the UE 106 may omit the PUSCH from the signal entirely, rather than merely further reducing the PUSCH power. For example, NR UL signal 708 illustrates a signal that has been reduced in power to comply with allowed NR transmit power level 722B. Specifically, because allowed NR transmit power level 722B is determined to be below the PUSCH threshold 724, the UE 106 has dropped the PUSCH from the signal. Thus, as illustrated, NR UL signal 708 does not include a PUSCH, and is left with only PUCCH 708A and SRS 708B.

As a further example, NR UL signal 710 illustrates a signal that has been further reduced in power to comply with allowed NR transmit power level 722C. Specifically, any PUSCH has been entirely omitted and SRS 710B has been reduced in power, while PUCCH 710A remains unchanged. As noted above, SRS 710B may have lower priority than the PUCCH 710A because it is the more error-tolerant. Thus, decreasing the power allocated to SRS 710B is less likely to result in decreased user experience than decreasing the power allocated to PUCCH 710A.

However, if the power allocated to SRS 710B is decreased too far, then the likelihood of reception failure for the SRS may become unacceptably high. Thus, the UE 106 may determine SRS threshold 726, which may represent a minimum transmit power at which transmission of the SRS is allowed (e.g., in response to determining that the allowed NR transmit power level is below the PUSCH threshold 724, that a PUSCH has been omitted, and/or that the SRS is the lowest-priority channel remaining in the NR UL signal). For example, in some scenarios, the UE 106 may determine a minimum power level to be allocated to the SRS, e.g., before the likelihood of reception failure may be come unacceptably high. The SRS threshold 726 may be determined by adding this minimum power level of the SRS to the power allocated to higher-priority PHY channels (e.g., PUCCH 710A). If the allowed NR transmit power level is determined to be below the SRS threshold 726, the UE 106 may omit the SRS from the signal entirely, rather than merely further reducing the SRS power. For example, NR UL signal 712 illustrates a signal that has been reduced in power to comply with allowed NR transmit power level 722D. Specifically, because allowed NR transmit power level 722D is determined to be below the SRS threshold 726, the UE 106 has dropped the SRS from the signal. Thus, as illustrated, NR UL signal 712 does not include an SRS, and is left with only PUCCH 712A.

As a further example, NR UL signal 714 illustrates a signal that has been further reduced in power to comply with allowed NR transmit power level 722E. Specifically, any PUSCH and SRS have been entirely omitted and PUCCH 714A has been reduced in power.

However, if the power allocated to PUCCH 714A is decreased too far, then the likelihood of reception failure for the PUCCH may become unacceptably high. Thus, the UE 106 may determine PUCCH threshold 728, which may represent a minimum transmit power at which transmission of the PUCCH is allowed (e.g., in response to determining that the allowed NR transmit power level is below the SRS threshold 726, that a PUSCH and/or SRS has been omitted, and/or that the PUCCH is the lowest-priority channel remaining in the NR UL signal). E.g., if the allowed NR transmit power level is determined to be below the PUCCH threshold 728, the UE 106 may omit the PUCCH from the signal entirely, rather than merely further reducing the PUCCH power. In such a scenario, the UE 106 may entirely forego transmitting the NR UL signal.

In some scenarios, the PUSCH threshold 724 may allow a greater reduction in power than the SRS threshold 726. For example, the UE 106 may allow reduction of the power allocated to the PUSCH by a large amount (e.g., up to 3 dB) before omitting the PUSCH, and may allow reduction of the power allocated to the SRS by a lesser amount (e.g., up to 1 dB) before omitting the SRS. This is because the PUSCH may be more tolerant of errors than the SRS. Similarly, one or both of the PUSCH threshold 724 and the SRS threshold 726 may allow a greater reduction in power than the PUCCH threshold 726. For example, the UE 106 may allow reduction of the power allocated to the PUCCH by only a very small amount (e.g., up to 0.5 dB) before omitting the PUCCH.

Figure 8:
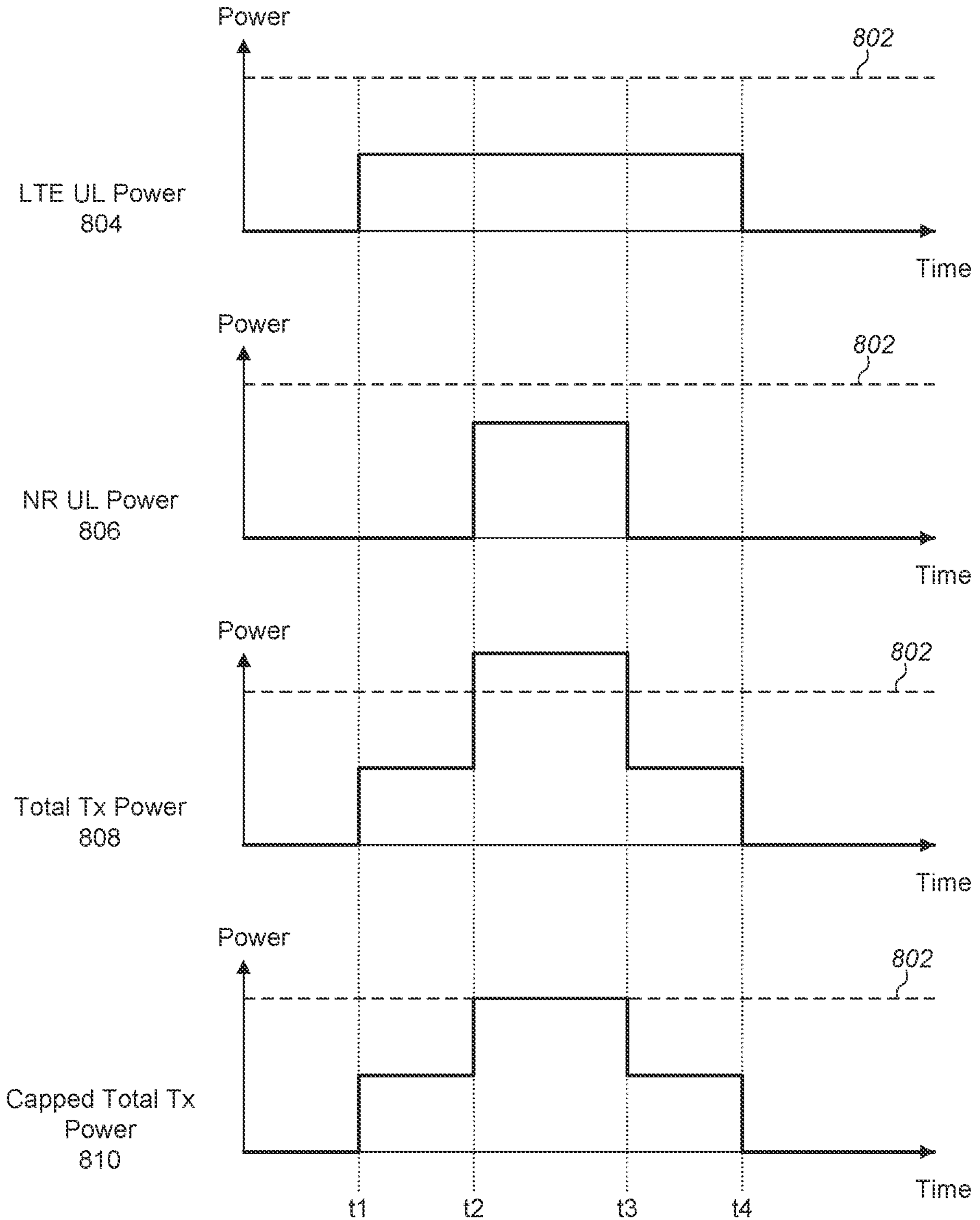
FIG. 8 illustrates example transmit power diagrams of the UE 106 operating in EN-DC mode, with reference to the PA stage threshold, according to some embodiments.

FIG. 8—PA Stage Aware Power Regulation

In some implementations, the UE 106 may include multiple power amplifier (PA) stages for use in UL transmission (e.g., included within the UL front end 572). For example, for transmissions having power below a PA stage threshold, the UE 106 may use a first PA stage. However, if required transmit power increases beyond the PA stage threshold, then the UE 106 may alternatively (or additionally) use a second PA stage, e.g., utilizing additional or alternative power amplifiers, or modifying power amplifier configuration. This may allow the UE 106 to utilize power amplifiers that are configured for higher efficiency within the power range currently being used.

However, activating the second PA stage during an UL transmission may result in a sudden phase shift in the transmitted signal, as different/additional PAs, or different PA configurations, are activated within the transmit chain. Such a sudden phase shift may cause a receiving device to be unable to demodulate the signal. Thus, it is desirable to avoid increasing transmit power beyond a PA stage threshold during an ongoing transmission. In some implementations, the UE 106 may have more than two PA stages, resulting in more than one PA stage threshold.

FIG. 8 illustrates example transmit power diagrams of the UE 106 operating in EN-DC mode, with reference to the PA stage threshold, according to some embodiments. Specifically, the curve 804 illustrates transmit power allocated for an LTE UL signal to be transmitted by the UE 106. The dotted line 802 represents a PA stage threshold. As illustrated, transmission of the LTE UL signal begins at time t1 and ends at time t4. The transmit power level 804 allocated to the LTE UL signal remains below the PA stage threshold 802.

The curve 806 illustrates transmit power allocated for a NR UL signal to be transmitted by the UE 106. As illustrated, transmission of the NR UL signal begins at time t2 and ends at time t3. The transmit power level 806 allocated to the LTE UL signal remains below the PA stage threshold 802.

The curve 808 illustrates total transmit power allocated for UL transmission, including both the LTE UL signal and the NR UL signal to be transmitted by the UE 106. As illustrated, at time t1, the UE 106 begins transmission of the LTE UL signal, with a transmit power level below the PA stage threshold 802. Thus, the UE 106 may use a first PA stage in transmitting the signal. However, at time t2, the UE 106 also begins transmission of the NR UL signal, causing the total transmit power level 808 allocated for the combination of the LTE UL signal and the NR UL signal to exceed the PA stage threshold 802. As a result, the UE 106 may activate a second PA stage (e.g., assisting or replacing the first PA stage). This may result in a sudden phase shift in the ongoing LTE UL signal. At time t3, the UE 106 may complete transmission of the NR UL signal, causing the total transmit power level 808 to drop below the PA stage threshold 802. As a result, the UE 106 may deactivate the second PA stage and resume use of the first PA stage. This may result in a second sudden phase shift in the ongoing LTE UL signal. At time t4, the UE 106 may complete transmission of the LTE UL signal.

The curve 810 illustrates total transmit power allocated for UL transmission, including both the LTE UL signal and the NR UL signal to be transmitted by the UE 106, in which the total transmit power level 810 is reduced (e.g., capped) so as to avoid these sudden phase shifts. Specifically, the power allocated to the NR UL signal may be capped at a level that will prevent the total transmit power level 810 from meeting (or exceeding) the PA stage threshold 802.

However, if the power allocated to NR UL signal is decreased too far, then the likelihood of reception failure for the NR UL signal may become unacceptably high. Thus, the UE 106 may determine a NR UL signal threshold, which may represent a minimum transmit power at which transmission of the NR UL signal is allowed. E.g., if the PA stage threshold 802 is determined to be below the NR UL signal threshold, then the UE 106 may entirely forego transmitting the NR UL signal, rather than merely further reducing the NR UL signal power. In such a scenario, the UE 106 may transmit only the LTE UL signal, e.g., as illustrated by curve 804.

It should be appreciated that the PA stage threshold 802 may be considered to be a transmit power limitation that may be considered when determining an allowed NR transmit power level, e.g., as discussed with regard to FIG. 6 and/or FIG. 7. Thus, in some scenarios, the power allocated to the NR UL signal may be decreased, as illustrated by the capped total transmit power level 810, in a manner consistent with any of the scenarios discussed above in connection with FIG. 6 and/or FIG. 7.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102, or some component thereof, such as the wireless communication circuitry 330 or the modem 520) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

receiving from a base station a first transmit power level for a first communication for transmission by a wireless communication device according to a first radio access technology (RAT);

determining a first threshold reduction level for the first communication;

determining an allowed transmit power level, based on a maximum transmit power limitation of the wireless communication device and a current transmit power level of an ongoing communication being transmitted by the wireless communication device according to a second RAT; and in response to determining that the allowed transmit power level meets the first transmit power level reduced by the first threshold reduction level, transmitting the first communication having a power level not greater than the allowed transmit power level; or in response to determining that the allowed transmit power level does not meet the first transmit power level reduced by the first threshold reduction level, forego transmission of the first communication.

2. The method of claim 1, further comprising:

identifying a preferred transmit power level of the first communication, wherein the first threshold reduction level is determined as a function of the preferred transmit power level of the first communication.

3. The method of claim 1, further comprising:

in response to determining that a transmission according to the second RAT has ended after the determining that the allowed transmit power level does not meet the first transmit power level reduced by the first threshold reduction level:

determining an updated allowed transmit power level; and transmitting the first communication in response to determining that the updated allowed transmit power level meets the first transmit power level reduced by the first threshold reduction level.

4. The method of claim 1, wherein the first communication comprises a first physical layer (PHY) channel, the method further comprising:

determining a second threshold reduction level for a second communication for transmission according to the first RAT, the second communication comprising a second PHY channel, the second threshold reduction level being lower than the first threshold reduction level;

in response to determining that the allowed transmit power level meets the first transmit power level reduced by the second threshold reduction level, transmit the second communication according to the first RAT, the second communication having a power level not greater than the allowed transmit power level, and not less than the first transmit power level reduced by the second threshold reduction level.

5. A non-transitory computer-readable memory medium storing instructions that, when executed by a processor of a wireless communication device, cause the wireless communication device to:

receive from a base station a first transmit power level for a first communication according to a first radio access technology (RAT);

determine a first threshold reduction level for the first communication;

determine an allowed transmit power level, based on a maximum transmit power limitation and a current transmit power level being transmitted according to a second RAT;

in response to determining that the allowed transmit power level meets the first transmit power level reduced by the first threshold reduction level, transmit the first communication having a power level not greater than the allowed transmit power level; and in response to determining that the allowed transmit power level does not meet the first transmit power level reduced by the first threshold reduction level, forego transmission of the first communication.

6. The non-transitory computer-readable memory medium of claim 5, wherein the instructions further cause the wireless communication device to:

identify a preferred transmit power level of the first communication, wherein determining the allowed transmit power level is in response to determining that a sum of the preferred transmit power level of the first communication and the current transmit power level being transmitted according to the second RAT exceeds the maximum transmit power limitation.

7. The non-transitory computer-readable memory medium of claim 5, wherein the instructions further cause the wireless communication device to:

identify a preferred transmit power level of the first communication, wherein the first threshold reduction level is determined as a function of the preferred transmit power level of the first communication.

8. The non-transitory computer-readable memory medium of claim 7, wherein the function varies based on a type of a physical layer (PHY) channel included in the first communication.

9. The non-transitory computer-readable memory medium of claim 5, wherein the instructions further cause the wireless communication device to:

in response to determining that a transmission according to the second RAT has ended after the determining that the allowed transmit power level does not meet the first transmit power level reduced by the first threshold reduction level:

determine an updated allowed transmit power level; and transmit the first communication in response to determining that the updated allowed transmit power level meets the first transmit power level reduced by the first threshold reduction level.

10. The non-transitory computer-readable memory medium of claim 5, wherein the first communication consists of a first physical layer (PHY) channel, and wherein transmitting the first communication comprises transmitting a signal comprising a plurality of PHY channels including the first PHY channel.

11. The non-transitory computer-readable memory medium of claim 5, wherein the first communication comprises a first physical layer (PHY) channel, wherein the instructions further cause the wireless communication device to:

determine a second threshold reduction level for a second communication according to the first RAT, the second communication comprising a second PHY channel, the second threshold reduction level being lower than the first threshold reduction level;

in response to determining that the allowed transmit power level meets the first transmit power level reduced by the second threshold reduction level, transmit the second communication according to the first RAT, the second communication having a power level not greater than the allowed transmit power level; and in response to determining that the allowed transmit power level does not meet the first transmit power level reduced by the second threshold reduction level, forego transmission of the second communication.

12. The non-transitory computer-readable memory medium of claim 5, wherein the maximum transmit power limitation indicates a maximum power that may be transmitted without activating a currently inactive power amplifier (PA) stage of the wireless communication device.

13. An apparatus comprising:

a memory storing software instructions; and at least one processor configured to execute the software instructions to:

receive a first transmit power level for a first communication for transmission by a wireless communication device according to a first radio access technology (RAT);

determine a first threshold reduction level for the first communication;

determine an allowed transmit power level, based on a maximum transmit power limitation of the wireless communication device and a current transmit power level of an ongoing communication being transmitted by the wireless communication device according to a second RAT;

in response to determining that the allowed transmit power level meets the first transmit power level reduced by the first threshold reduction level, cause the wireless communication device to transmit the first communication, the first communication having a power level not greater than the allowed transmit power level; and in response to determining that the allowed transmit power level does not meet the first transmit power level reduced by the first threshold reduction level, forego transmission of the first communication.

14. The apparatus of claim 13, wherein the at least one processor is further configured to execute the software instructions to:

identify a preferred transmit power level of the first communication, wherein determining the allowed transmit power level is in response to determining that a sum of the preferred transmit power level of the first communication and the current transmit power level of the ongoing communication being transmitted according to the second RAT exceeds the maximum transmit power limitation.

15. The apparatus of claim 13, wherein the at least one processor is further configured to execute the software instructions to:

identify a preferred transmit power level of the first communication, wherein the first threshold reduction level is determined as a function of the preferred transmit power level of the first communication.

16. The apparatus of claim 15, wherein the function varies based on a type of a physical layer (PHY) channel included in the first communication.

17. The apparatus of claim 13, wherein the at least one processor is further configured to execute the software instructions to:

in response to determining that a transmission according to the second RAT has ended after the determining that the allowed transmit power level does not meet the first transmit power level reduced by the first threshold reduction level:

determine an updated allowed transmit power level; and cause the first communication to be transmitted in response to determining that the updated allowed transmit power level meets the first transmit power level reduced by the first threshold reduction level.

18. The apparatus of claim 13, wherein the first communication consists of a first physical layer (PHY) channel, and wherein causing the first communication to be transmitted comprises causing a signal to be transmitted, the signal comprising a plurality of PHY channels including the first PHY channel.

19. The apparatus of claim 13, wherein the first communication comprises a first physical layer (PHY) channel, wherein the at least one processor is further configured to execute the software instructions to:

determine a second threshold reduction level for a second communication for transmission according to the first RAT, the second communication comprising a second PHY channel, the second threshold reduction level being lower than the first threshold reduction level;

in response to determining that the allowed transmit power level meets the first transmit power level reduced by the second threshold reduction level, cause the second communication to be transmitted according to the first RAT, the second communication having a power level not greater than the allowed transmit power level; and in response to determining that the allowed transmit power level does not meet the first transmit power level reduced by the threshold reduction level, forego transmission of the second communication.

20. The apparatus of claim 13, wherein the maximum transmit power limitation indicates a maximum power that may be transmitted without activating a currently inactive power amplifier (PA) stage of the wireless communication device.

* * * * *